(12) United States Patent
Hunacek et al.

(10) Patent No.: US 11,436,350 B2
(45) Date of Patent: Sep. 6, 2022

(54) PROTECTING MEDIA CONTENT

(71) Applicant: NAGRAVISION S.A., Cheseaux-sur-Lausanne (CH)

(72) Inventors: Didier Hunacek, Cheseaux-sur-Lausanne (CH); Herve Goupil, Cheseaux-sur-Lausanne (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 482 days.

(21) Appl. No.: 16/484,343

(22) PCT Filed: Feb. 2, 2018

(86) PCT No.: PCT/EP2018/052714
§ 371 (c)(1),
(2) Date: Aug. 7, 2019

(87) PCT Pub. No.: WO2018/146025
PCT Pub. Date: Aug. 16, 2018

(65) Prior Publication Data
US 2020/0028698 A1 Jan. 23, 2020

(30) Foreign Application Priority Data
Feb. 9, 2017 (EP) ..................................... 17155502

(51) Int. Cl.
*G06F 21/60* (2013.01)
*G06F 21/10* (2013.01)
(Continued)

(52) U.S. Cl.
CPC ............ *G06F 21/606* (2013.01); *G06F 21/10* (2013.01); *H04L 9/0841* (2013.01);
(Continued)

(58) Field of Classification Search
None
See application file for complete search history.

(56) References Cited

U.S. PATENT DOCUMENTS

2002/0007452 A1* 1/2002 Traw ..................... G06F 21/445
705/57
2006/0209745 A1* 9/2006 MacMullan ..... H04N 21/43637
370/328
(Continued)

FOREIGN PATENT DOCUMENTS

EP           1 773 060 A2    4/2007
WO    WO 2015/175185 A1    11/2015

OTHER PUBLICATIONS

International Search Report dated Apr. 3, 2018 in PCT/EP2018/052714 filed on Feb. 2, 2018.

*Primary Examiner* — Bradley W Holder
(74) *Attorney, Agent, or Firm* — Oblon, McClelland, Maier & Neustadt, L.L.P.

(57) ABSTRACT

Content source and sink devices and methods help to guard against compromising security of content transferred from a source device to a sink device, for example where a primary encryption mechanism protecting the content has been compromised. A content source device is configured to connect to a content sink device to transmit digital media content to the content sink device. The content source device includes a connection module configured to establish a connection to the sink device, encrypt a digital media content for transmission across the connection with a first cipher using a connection key, and transmit the encrypted digital media content to the sink device over the connection. The content source also includes a protection module configured to prevent the sink device from using the digital media content without authorisation. The protection module receives a digital certificate identifying the sink device, verifies the (Continued)

digital certificate, and determines if the digital certificate identifies a sink device authorised to receive digital media content over the connection. If the determination is positive, the protection module enables the sink device to use the digital media content.

11 Claims, 6 Drawing Sheets

(51) Int. Cl.
*H04L 9/08* (2006.01)
*H04L 9/32* (2006.01)
*H04L 9/40* (2022.01)
*H04N 21/4408* (2011.01)
*H04N 21/4627* (2011.01)

(52) U.S. Cl.
CPC ........ *H04L 9/3268* (2013.01); *H04L 63/0442* (2013.01); *H04N 21/4408* (2013.01); *H04N 21/4627* (2013.01); *G06F 2221/0753* (2013.01)

(56) References Cited

U.S. PATENT DOCUMENTS

| 2006/0209884 | A1* | 9/2006 | MacMullan | H04N 7/083 |
| | | | | 370/465 |
| 2007/0091359 | A1 | 4/2007 | Suzuki et al. | |
| 2011/0150214 | A1 | 6/2011 | Gleim et al. | |
| 2012/0096260 | A1 | 4/2012 | Suzuki et al. | |
| 2013/0067223 | A1 | 3/2013 | Hiroyuki et al. | |
| 2013/0174238 | A1 | 7/2013 | Wang et al. | |
| 2015/0143119 | A1 | 5/2015 | Matsunaga | |
| 2015/0154999 | A1 | 6/2015 | Suzuki et al. | |
| 2016/0044004 | A1 | 2/2016 | Matsunaga | |
| 2016/0119302 | A1 | 4/2016 | Hwan et al. | |

* cited by examiner

PROTECTING MEDIA CONTENT

FIELD

The present disclosure relates to improvements in the protection of media content that is transmitted from a content source to a content sink, in particular although not exclusively over an encrypted and/or wired connection.

BACKGROUND

Modern multimedia content is often delivered in extremely high definition, such as in the case of 4K video. While such high definition content provides an improved experience for the viewer consuming the content, it also poses an increased risk associated with media piracy, as it allows for better reproduction in a wider range of contexts. Thus, the requirements for content protection have increased in line. Modern media interfaces, including wired, cable-based interfaces such as High Definition Media Interface (HDMI), therefore encrypt content when it is in transit between a source device, such as a set top box, DVD or Blu-ray® player, portable or desktop computer, and so forth, and a sink device, such as a television set, display screen or projector and the like. The current industry standard for protecting content in transit over such connections is High-bandwidth Digital Content Protection (HDCP). However, as the industry develops protection mechanisms such as HDCP, circumvention mechanisms are developed apace. In particular, it is believe that the set of keys that enable verification of devices implementing some versions of HDCP and the encryption of content in transit have become publicly known, enabling devices that circumvent some versions of HDCP to be placed in the market.

BRIEF DESCRIPTION OF THE DRAWINGS

Embodiments are disclosed herein by way of example with reference to the accompanying drawings, in which.

DETAILED DESCRIPTION

Figure 3:
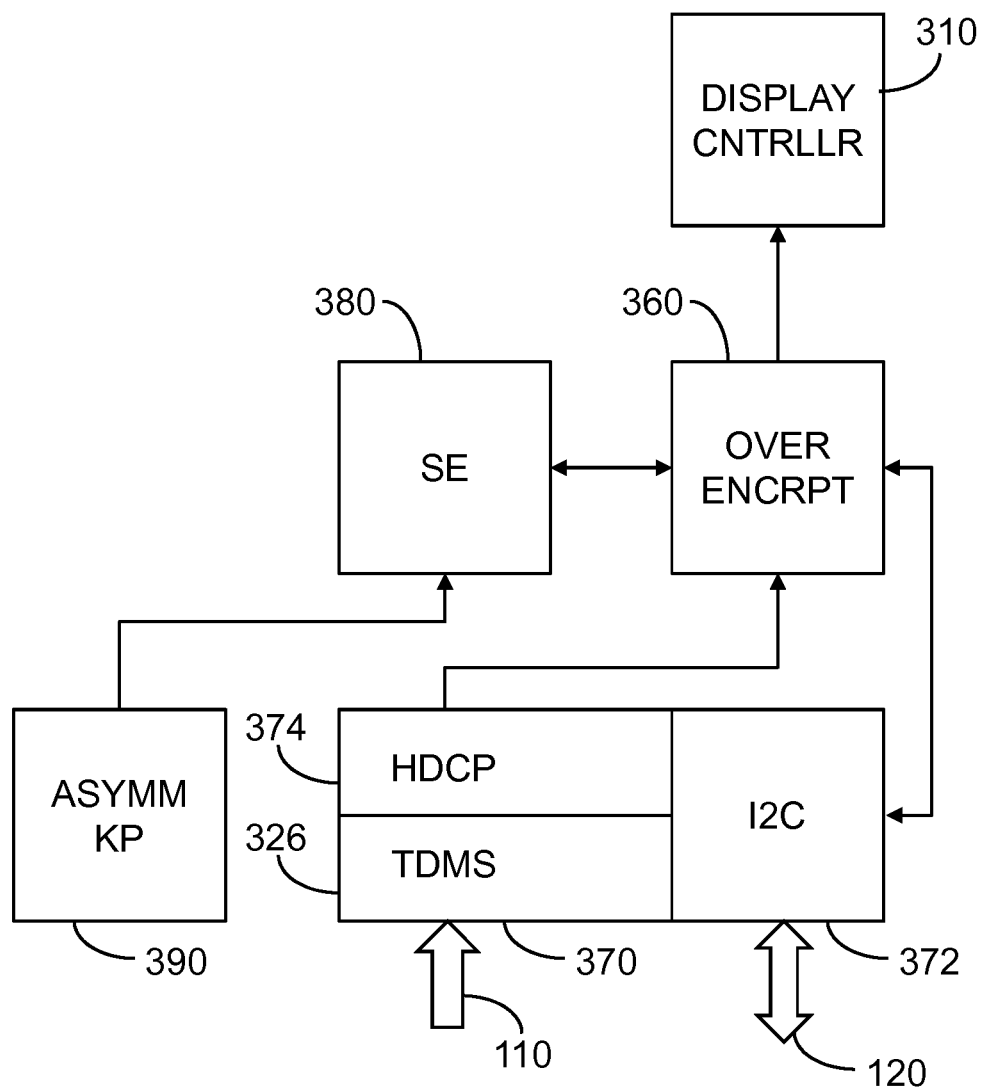
FIG. 3 illustrates components of the content sink device.

In overview, the present disclosure provides source and sink devices and methods that may help to guard against compromising the security of content transferred from a source device to a sink device, for example where a primary encryption mechanism protecting the content has been compromised.

In some aspects, a content source device, such as a set top box, media player, media disk player, desktop or portable computer, broadcast receiver, television set or the like, is disclosed. The content source device is configured to connect to a content sink device, such as a display device, television set and so forth, to transmit digital media content, for example a video stream such as a MPEG Transport Stream (TS) or Elementary Stream (ES), for example a 4K video stream, to the content sink device. The content source device comprises a connection module, for example a HDMI/HDCP or other HDCP module, configured to establish a connection to the sink device, encrypt digital media content for transmission across the connection with a first cipher using a connection key, for example a HDCP key, and transmit the encrypted digital media content to the sink device over the connection. The content source also comprises a protection module configured to prevent the sink device from using, for example displaying, causing display of, or decrypting ready for display, the digital media content without authorisation. The protection module receives a digital certificate identifying the sink device. The skilled person is of course familiar with digital certificates and understands that a digital certificate includes a public key of an asymmetric key pair, information identifying the sink device, for example one or more of a device model, manufacturer name, serial number and the like, and a digital signature allowing the certificate to be verified. The digital signature has been generated using a private key corresponding to the public key, as is well known in the art. The private key is typically controlled by a Certification Authority (CA) or other trusted entity, for example at the sink device manufacturer. Verification of the signature is done with the public key, as is well known in the art. Typically, the certificate identifying the sink device is installed at the sink device at the time of manufacture, or in any event before shipping, of the sink device The protection module verifies the digital certificate, for example by known techniques such as verifying a digital signature associated with the certificate, for example applied by a certification authority or device manufacturer, using the corresponding public key, and determines if the digital certificate identifies a sink device authorised to receive digital media content over the connection. If the determination is positive, the protection module enables the sink device to use the digital media content. Advantageously, by providing a layer of protection that verifies the sink device using a digital certificate, it can be ensured that only authorised sink devices that are not known to compromise the protection of the content can use the content and compromised sink devices can be stopped from divulging the content without protection by revoking the corresponding certificate, for example as detailed below.

The connection module does provide a degree of protection by using the connection key to protect the content. However, in particular where a global connection key is used or the connection key or information for deriving the connection key is fixed in the source and/or sink device and cannot be revoked securely if the connection key or connection key information is compromised, the security of the content would be compromised if the communication key is the only protection of the content. The protection module provides a further layer of security by checking the certificate identifying the sink device and enabling the content to be used by the sink device only if the device is authorised, that is, for example, the certificate is validated/has not been revoked. Thus, unauthorised use of the content can thus be prevented even if the connection key is compromised.

The connection key, or connection key information enabling the connection key to be obtained, for example calculated, may be predetermined, that is fixed prior to manufacture of the sink or source device, as applicable. The connection key or connection key information may be provisioned to the sink and/or source device at the time of manufacture. The connection key and/or connection key information may be stored persistently in the sink or source device, as applicable, at the time of manufacture. For example, each device may have a private key derived using a public identifier for the device from a predetermined fixed secret set of keys, known only to device manufacturers or other key issuers, and the devices can derive a shared key by exchanging their public identifier and combining it with their private key, for example in accordance with Blom's scheme, a symmetric threshold key exchange protocol used in HDCP. In embodiments in which the connection module implements a HDCP connection, for example a HDMI/HDCP connection, the connection key information is generated and provisioned in accordance with the HDCP standard. In particular when the connection key or connection key information is fixed prior to manufacture and/or is provisioned at the time of manufacture, as is the case for HDCP, security can be compromised due to the global nature of the key or key information generation process and the difficulty in revoking a connection key or key information, once it has been provisioned.

In some embodiments, the protection module is configured to generate a session key. In these embodiments, preventing the sink device from using the digital media content without authorisation may comprise encrypting the digital media content with a second cipher using a session key and transmitting the digital media content encrypted with the first and second ciphers to the sink device. Enabling the sink device to use the digital media content may comprise enabling the sink device to obtain the session key to decrypt the digital media content using the connection and session keys. The second cipher may be applied before or after the first cipher. In some embodiments, preventing use of the content may comprise, additionally or alternatively, corrupting the digital media content, replacing the digital media content with other data, preventing the digital media content from being transmitted to the sink device, and so forth.

In some embodiments, enabling the sink device to obtain the session key may comprise generating first session key information required to obtain the session key and transmitting the first session key information to the sink device. In such embodiments, generating the session key may comprise receiving second session key information from the sink device and generating the session key using the first and second session key information. For example, the session key information may be generated and exchanged to generate the session key in accordance with a Diffie-Hellman key sharing scheme. In some embodiments, the first session key information may comprise the session key and transmitting the first session key information may comprise encrypting the session key information using a public key of an asymmetric key pair associated with the sink device, for example received with the digital certificate, and transmitting the session key encrypted in this way.

In some embodiments, the protection module is configured to generate the first session key information, that is the first session key or information required to obtain it, periodically or in response to one or more of: power-up of the source device; boot-up of the source device; and establishing the connection. In any event, the first session key information may be generated using a pseudo random number generator; generated using device entropy, for example using one or more readings of a noisy device parameter to seed a pseudo random number generator or using one or more readings or a transformation thereof as the first session key information itself.

In some embodiments, the protection module may comprise a secure element. The secure element is configured to receive and verify the digital certificate. In some such embodiments, the protection module comprises a secure element and a cipher portion. The secure element is then configured to receive and verify the digital certificate and to send the first session key information to the cipher portion over a private data bus isolated from the remainder of the content source device. In some embodiments, the secure element receives the digital certificate from the cipher portion over the private bus. The cipher portion may have received the digital certificate from the connection module, for example. The secure element may also generate the session key, for example from the first and second session key information, as described above. To this end, the secure element may receive the second session key information over the private bus. The sink device may also comprise a secure element that stores the digital certificate, including the public key and the private key of an asymmetric key pair of the sink device. The secure element of the sink device may handle the provisioning of the certificate, the asymmetric encryption in embodiments where this is used for key sharing or other purposes, and the verification of a source device digital certificate received from the source device in embodiments in which the sink device also authenticates the source device.

In some embodiments, determining if the sink device is authorised to receive the digital media content may comprise matching the digital certificate with authorisation data. The authorisation data may be received by the content source device from an external data source, for example using messages received, for example by digital broadcast as part of a TS, by a Conditional Access System (CAS) of the source device such as Entitlement Control (ECC) or Entitlement Management Messages (EMM), or message received by reading from a physical media carrier such as a DVD or Bluray® disk, for example as part of digital rights management (DRM) data, and so forth. The authorisation data may comprise a black list, a list of certificates/identifiers that are not authorised or are blocked and/or a white list, a list of certificates/identifiers that are authorised or are not blocked. Where both a while list and a black list is used, use of the content may only be enabled if the certificate/identifier is present in the white list and not present in the black list. The lists may identify individual certificates/identifiers, which may be associated with individual devices or with groups of devices, such as devices from a particular manufacturer, of a particular type or model, and the like. Additionally, or alternatively, the lists may identify groups, families or ranges of certificates/identifiers. In connected devices, the source device may check the authorisation of the sink device by checking the digital certificate against remote authorisation data, for example by querying a database on a server or using a secure message received from, for example, a CAS where present. The authorisation check may be carried out by the SE, where present.

In some embodiments, the source device is configured to receive a control message, preferably a secure message digitally signed by the message source. The control message may activate the protection module and hence may be referred to as an activation message. The secure message may, for example, be received from the message source, for example a content provider, via the CAS, where present. In embodiments with a SE, the SE may handle the control message and activate the cipher component. The cipher component may in turn send a control message to the sink device, for example over the connection, to activate the protection module in the sink device. Alternatively, the SE may do so directly. Since the control message sent to the sink device activates the protection module in the sink device, it may be referred to as an activation message. The control message may comprise settings for the cipher component and/or the sink device protection module, for example indicating whether the cipher component should be activated or deactivated or to change encryption parameters of the cipher. In some embodiments, the system remains activated until reboot or reset of the source device, until the connection is removed or restored, or until a content item has finished being transmitted over the connection. In some embodiments, the protection module remains permanently activated once the control message has been processed, or remains activated until a deactivation message is received and processed.

The control/activation message may be a bitmap that activates the protection module in the source device and/or the protection module in the sink device.

Independent of the data format, the control/activation message may be generated by the source device using revocation information (a revocation list) received form a CAS, for example in one or more EMM. It will be understood that revocation information is a special case of authorisation information, e.g. a black list as discussed above. In some embodiments, authorisation information in the form of, e.g., a white list as discussed above may be received instead or in addition. The revocation information (or more generally authorisation information) may enable identification of sink devices (or types of sink devices) that have been revoked, for example information identifying revoked certificates. The control/activation message, whether generated by the source device or received by the source device, may be updated one or more times, for example repeatedly or periodically, using the revocation information. The generation of the control/activation message may be handled inside the secure element, for example in hardware. Whether generated at the source device or received from outside the source device, the control/activation message may be transmitted to and/or processed in hardware by the protection module, and/or related modules such as an encryption module. Processing in hardware rather than software may help to reduce vulnerability to attacks.

In some embodiments, the connection between the source and sink devices is a wired connection comprising a cable removably connected between the content source device and the content sink device. For example, the connection module may implement a High-bandwidth Digital Content Protection (HDCP) protocol to encrypt the digital media content. In some such embodiments, the connection module may implement a High Definition Multimedia Interface (HDMI) to establish the connection, with HDCP or another encryption. Alternatively, the connection module may implement a Display Port or Digital Video Interface connection, with HDCP or alternative encryption. In some embodiments, the connection may be a wireless instead of a wired connection, for example via WIFI, Bluetooth, and the like. In some embodiments, the source and sink devices are connected by a wired connection, for example as described above, but the connection module does not encrypt the digital content but sends it in unencrypted form.

In some aspects, a content sink device is disclosed, configured to connect to a content source device to receive digital media content from the content source device. The content sink device comprises a connection and a protection module. The connection module is configured to establish a connection to the source device; receive the encrypted digital media content from the source device over the connection; and decrypt digital media content received over the connection using a first cipher with a connection key. The protection module is configured to send a digital certificate identifying the sink device to the source device over the connection.

The protection module may, in some embodiments, further be configured to receive, from the source device, first session key information required to obtain a session key; obtain the session key using the first session key information; and use the session key to decrypt the content, before or after using the connection key to decrypt the content. Obtaining the session key may comprise sending second session key information to the source device and generating the session key using the first and second session key information. In some embodiments, not only is the sink device configured to send its certificate to the source device, which is configured to verify it, but the source device is also configured to send its certificate to the sink device, which is configured to receive and verify it, by comparison against authorisation data, stored locally and/or obtained remotely, as described above. Advantageously, in this way the sink device can verify that the source device is not compromised to foil attacks by a compromised source device trying to obtain legitimate sink certificates or key information.

In some embodiments, the sink and/or source devices are configured to enable or disable the protection module based on an internal or external input, for example based on setting in content usage rules provided to the device, for example to a CAS or DRM component of the device, or a control message as described above. In some embodiments, the content source device controls the enabling and disabling of the protection modules in both the source and sink devices, for example as a function of usage rules (indicating whether the protection module is required or not) received at the source device.

In some aspects, methods implemented by the sink and source devices, as described above are also disclosed, as well as corresponding systems comprising means for implementing such methods and computer program products, for example one or more computer readable non-transient tangible media, comprising coded instructions that, when run on a computer processor, implement such methods.

Figure 1:
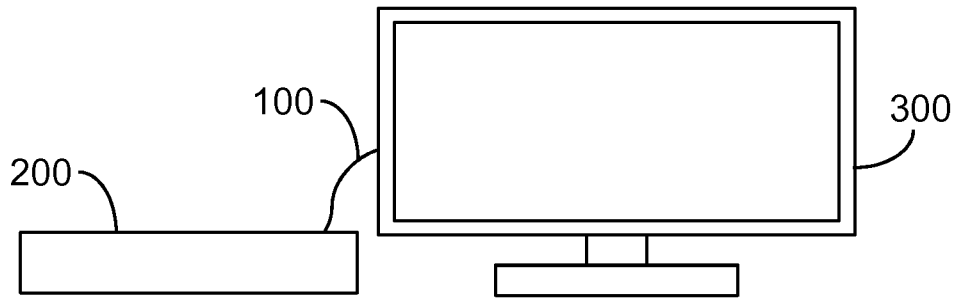
FIG. 1 illustrates a media consumption system comprising a content source device and a content sink device.

Some specific embodiments will now be described by way of example to illustrate aspects of the disclosure. With reference to FIG. 1, a cable 100, for example a HDMI cable, connects a source device 200, for example a set top box or media player, to a sink device 300, for example a television set or other display device. The source device 200 may receive content and other data such as CAS data or DRM data from a digital broadcast, for example terrestrial, cable or satellite, over the top from an internet connection or from a digital media such as a media disk, as the case may be. The description below focuses on a broadcast embodiment in which broadcast content is received by the source device using a receiver module but is equally applicable to media player embodiments with appropriate modifications such as replacing a CAS with a DRM component and a receiver with a media reader.

Figure 2:
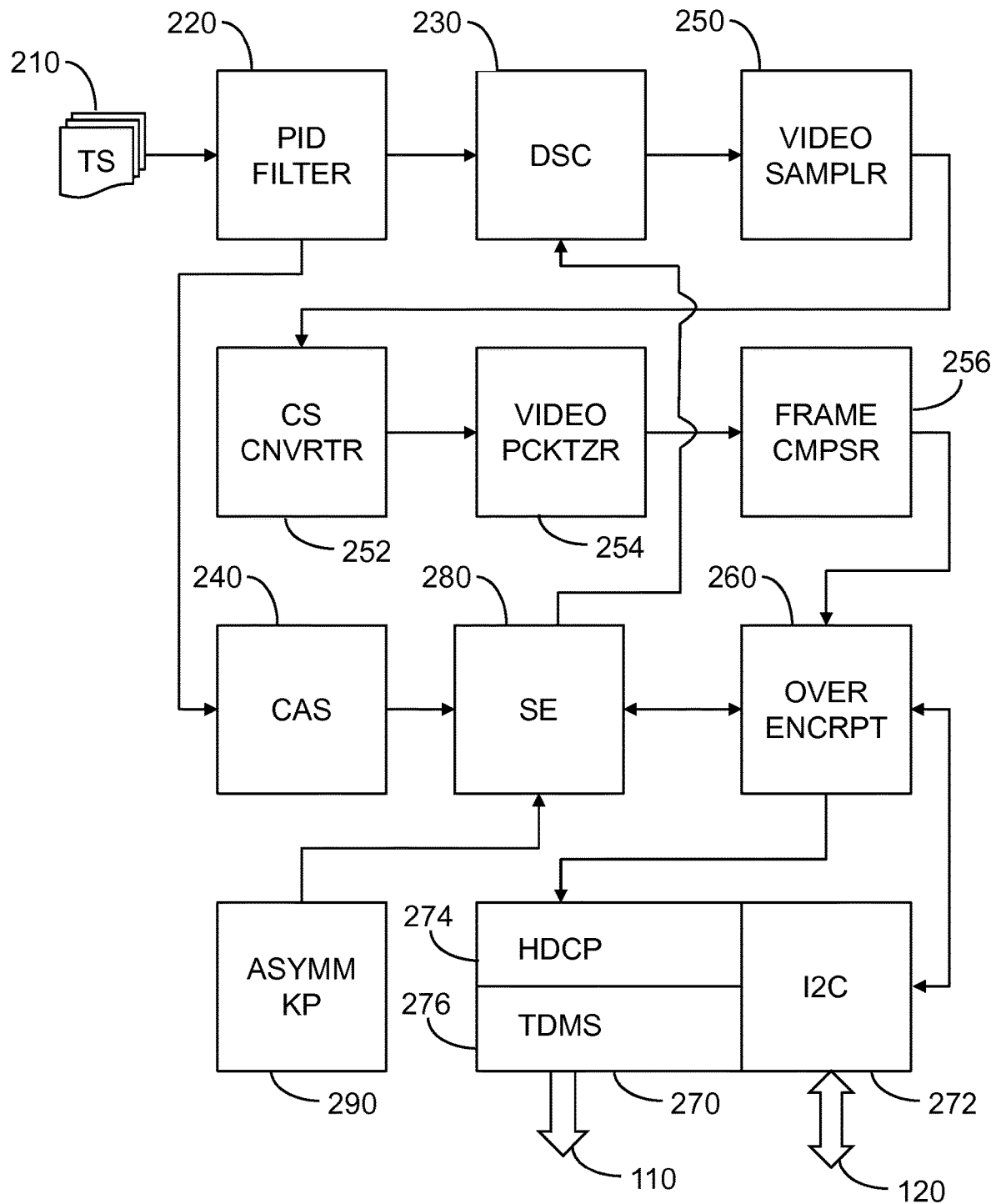
FIG. 2 illustrates components of the content source device.

With reference to FIG. 2, the source device 200 comprises a receiver (not shown) which receives a packetized broadcast signal and reconstructs a TS 210. A packet filter 220 is connected to the receiver and configured to analyse the packets of the TS and route them accordingly either to a descrambler 230 (video coding packets) or to a CAS 240 (CAS packets such as ECM or EMM, usage rules, and so forth), as the case may be. The descrambler 230 is configured to descramble the video coding packets using a content key provided to it via the CAS 240. The descrambled content is routed via video processing components comprising a video sampler 250, colour space converter 252, video packetiser 254 and frame composer 256 to a cipher component 260, which is configured to encrypt the content with a session key, for example using a stream cipher. The session key, cipher component 260 and CAS 240 are described in more detail below. A connection component 270 is connected to the cipher component 260 and configured to receive the encrypted content from the cipher component 260 and to transmit the (audio and video) content to the sink device 300 via the cable 100, specifically over a media connection 110 through the cable 100. The connection component 270 is further configured to send and receive control information to and from the sink device 300 over a control connection 120 through the cable 100. For example, in some embodiments, the connection component 270 implements a HDMI connection and provides a bi-directional data bus 272, for example an I²C bus implementing a Display Data Channel, for control data, an HDCP component 274 to encrypt the content data (which may have been already encrypted by the cipher component 260—see below) and a Transition Minimized Differential Signalling (TMDS) component 276 to transmit the (potentially twice) encrypted content over the cable 100. As is well known, HDCP involves the source device encrypting the received content using a connection key derived from connection key information associated with the source device using key sharing according to HDCP.

The CAS 240 is connected to the packet filter 220 to receive CAS packets from the TS, for example comprising ECM and EMM messages that define the entitlement to consume content and provide a content key (in encrypted form), as well as usage rules that specify how the content may be used and may, for example specify that the content may only be sent through the connection component 270 after encryption by the cipher component 260. The CAS 240 is connected to a Secure Element (SE) 280 and is configured to provide the content key to the SE 280 for decryption. The SE 280 is configured to decrypt the content key and to provide it to the descrambler 230 when required.

The cipher component 260 is in bidirectional communication with the data bus 270 to exchange messages with the sink device 300 and, specifically, to receive a digital certificate from the sink device 300. Depending on the embodiment, the cipher component may also be configured to send a digital certificate to allow the cipher component of the sink device 300 to verify the source device 200. The cipher component is in communication with the SE 280 and the SE 280 is configured to verify the received digital certificate against authorisation data stored by the secure element or stored in encrypted form in a memory of the source device 200. The authorisation data may be in the form of a white list (listing sink device certificates, groups or ranges of certificates, that are authorised) and/or a blacklist (listing sink device certificates, groups or ranges of certificates, that are not authorised). The authorisation data may be obtained by the source device from a remote source, for example with an EMM via the CAS 240, from an internet server via an Internet connection (not shown) or otherwise. Alternatively, where an on-demand data connection is available, for example an Internet connection, the authorisation data may be accessed remotely when required.

In the same way as obtaining authorisation data, the cipher component 260 or SE 280 may be configured to receive a control message over the same or a different data channel as the authorisation data, for example via the CAS 240 in and ECM, EMM or otherwise. In response to the control message, for example, the SE 280 may activate the cipher function of the cipher component 260 and the latter may activate a cipher component in the sink device 300. The control message may also contain settings for the cipher components in the source device 200 and/or sink device 300. Prior to activation, or when deactivated with a control message or otherwise, the cipher component 260 may be bypassed or enter or remain in a pass-through state in which the content is passed through the cipher component 260 without being encrypted.

In embodiments where communications between the source and sink devices are encrypted and/or where the sink device 300 also verifies the identity of the source device 200, the SE 280 is in communication with a secure memory 290 storing an asymmetric key pair and corresponding digital certificate authenticating the public key of the key pair.

With reference to FIG. 3, the sink device 300 comprises a connection component 370 configured to receive the encrypted content from the cable 100, specifically over a content connection 110 through the cable 100. The connection component 370 is further configured to send and receive control information to and from the source device 200 over a control connection 120 through the cable 100. For example, in some embodiments, the connection component 370 implements a HDMI connection and provides a bi-directional data bus 372, for example an I²C bus implementing a Display Data Channel, for control data, a Transition Minimized Differential Signalling (TMDS) component 376 to receive the encrypted content data over the cable 100 and an HDCP component 374 to decrypt the content data. A cipher component 360 is configured to receive the content decrypted by the HDCP component 374 and to decrypt it using the session key. As is well known, HDCP involves the sink device decrypting the received content using a connection key derived from connection key information associated with the sink device using key sharing according to HDCP. A SE 380 is connected to the cipher component 360 and to a secure memory 390 storing an asymmetric key pair and digital certificate for the sink device 300. The SE is configured to provide the digital certificate with the sink device 300 public key to the source device 200 via the cipher component 360 and the connection component 370 and, in some embodiments, to receive and verify a digital certificate from the source device 200 via the same route. The cipher component 360 is connected to a display controller 310 configured to receive the decrypted content from the cipher component 360 and to cause display of the content on a display device of the sink device 300, for example as illustrated in FIG. 1. The cipher component 360 and/or SE 380 may be configured to process a control message to activate the decryption functionality of the cipher component 360 in response to the control message, which may also comprise settings for the cipher component 360. Prior to activation, or when deactivated with a control message or otherwise, the cipher component 360 may be bypassed or enter or remain in a pass-through state in which the content in passed through the cipher component 360 without being decrypted.

In order to be able to encrypt and decrypt the content, the cipher components 260 and 360 are configured to exchange a session key for use in encryption and decryption, for example as described below. To this end the cipher components 260 and 360, or the respective SE 280, 380, may be configured to generate a number or string representing information useable to share the session key—the information may be the key itself or information from which the key can be generated, possibly after passing one or more messages. The information may be generated using a respective random number generator, for example a pseudo random number generator seeded with device entropy, a transformation of a noisy device parameter, a physical unclonable function, and so on. cipher components 260, 280 and/or SE 280, 380 may implement the random number generator and a Diffie-Hoffmann Scheme, or other key sharing scheme, for example generating a key at the source device 200 and sending it to the sink device 300 using asymmetric encryption following an exchange of digital certificates (those mentioned above or other ones specifically used for key sharing). The session key may remain valid while the connection is in place and a new session key may be generated and shared each time a new connection is established. Alternatively, the session key may remain valid for longer, e.g. between device reboots. or shorter, e.g. for the duration of transmitting a particular content item only.

Figure 4:
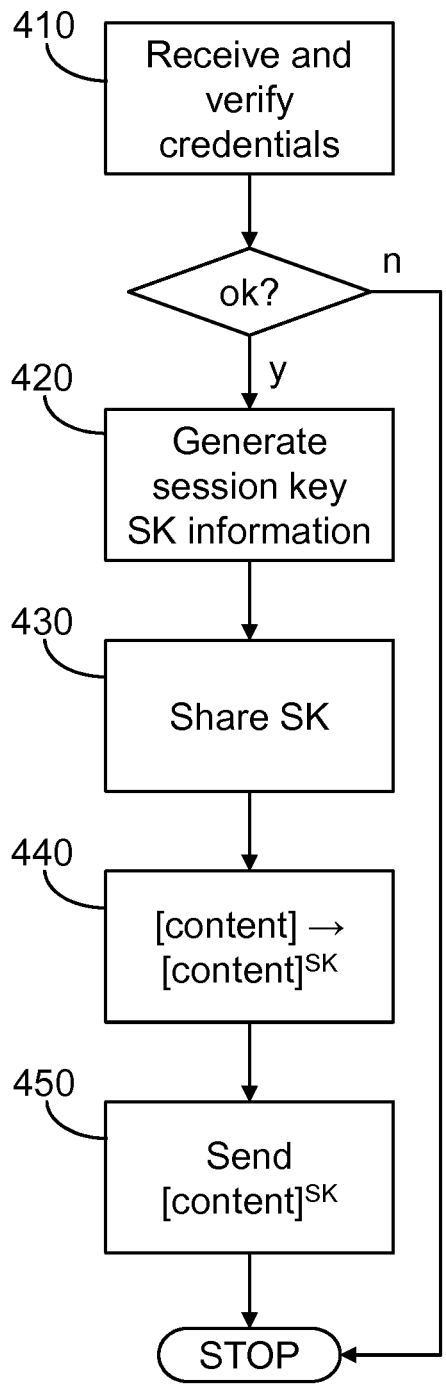
FIG. 4 illustrates operation of the content source device.

With reference to FIG. 4, operation of the source device 200 is now described, once a connection has been established, for example once the cable 100 has been connected between source and sink devices 200, 300 and the cipher component 260 is active (either because an activation message, that is a control message activating the cipher component 260, has been processed, or because it is active by default, e.g. always or in response to establishing a connection). At step 410, the source device 200 receives a digital certificate identifying the sink device 300 from the sink device 300 and verifies the digital certificate using a public key of, e.g. a device manufacturer of the sink device 300 obtained previously or installed at the time of manufacture of the source device 200. In embodiments where the sink device 300 authenticates the source device 200, the source device also sends its digital certificate to the sink device 300, for example in response to a positive verification of the sink device 300 digital certificate. If the verification fails, the process ends. As a result, the session key is not shared with the sink device 300 and the content cannot be decrypted and used by the sink device 300.

If verification of the credentials was passed at step 410, session key information is generated, for example by the SE 280 or the cipher component 260. In embodiments where a Diffie-Hellmann scheme is used for the key exchange, the session key information may be the result of a cyclic transformation of a public root repeated n times, with n being a natural number between 1 and the order of the cyclic group used, for example the natural numbers encodable with 1024 or 2048 bits. The result is often referred to as a public key and n as a private key and they will be referred to as SKpub and SKprv, respectively, below. The cyclic transformation may, for example be a modular exponentiation with a 1024 or 2048 bit prime number p or an elliptic curve operation. For example, SKpub=g^(SKprv)mod p. Other embodiments may directly generate the session key as the session key information.

At step 430, the session key information is shared by the source device 200. In the example of a Diffie-Hoffmann or similar key exchange scheme, the source session key information, for example the source public key SKpubsrc, may be generated by the source device 200, for example as described above. In these examples, step 430 may also include receiving corresponding session key information, for example sink public key SKpubsnk, generated by the sink device 300, for example as described above for the source device 200, from the sink device 300 and using the received session key information to obtain the session key, for example combining the local secret key SKprvsrc and the received session key information/public key, for example SK=SKpubsnk^(SKprvsrc)mod p.

More generally, the respective information sent is the result of the cyclic transformation on which the Diffie-Hellmann scheme is based, applied SKprvsrc or SKprvsnk times, as the case may be, to the public root. The session key is obtained at the source device 200 by applying the cyclic transformation SKprvsrc times to the received session key information (SKpubsnk) and at the sink device 300 by applying the cyclic transformation SKprvsnk times to the received session key information (SKpubsrc). The public keys may be encrypted prior to sending using asymmetric encryption to allow implicit or explicit authentication of the public keys SKpubsrc and SKpubsink using the respective digital certificates, as described in more detail in the example below. Other key sharing schemes are used in different embodiments by sending and/or exchanging session key information and using the information in accordance with the respective key sharing scheme, an example of which is Blom's scheme. In some embodiments, the session key information is the session key itself and the source device 200 sends the session key to the sink device 300, either in clear text or encrypted using asymmetric encryption, for example using the public key received with the digital certificate from the sink device 300. The key share operations may be implemented by SE 280, 380, including the generation of the respective first and second session key information, and the generation of the session key from the locally generated and the received session key information.

At step 440, the cipher component 260 encrypts the content using the session key and at step 450 the encrypted content is sent by the connection component 270 to the sink device 300, applying any further encryption associated with the connection, for example in accordance with HDCP in the specific embodiment of a HDMI connection. The further encryption associated with the connection may use a connection key, derived from respective connection key information enabling derivation of the connection key and stored persistently in the source and sink device at the time of manufacture, as is the case in HDCP. It will appreciated that in many embodiments both the cipher component 260 and connection component 270 use a respective stream cipher and that steps 440 and 450 may therefore occur substantially concurrently with the (once) encrypted stream passing from the cipher component 260 to the connection component 270 and onwards (now twice encrypted) to the sink device 300. The process ends when the content has been sent or the connection disconnected.

Figure 5:
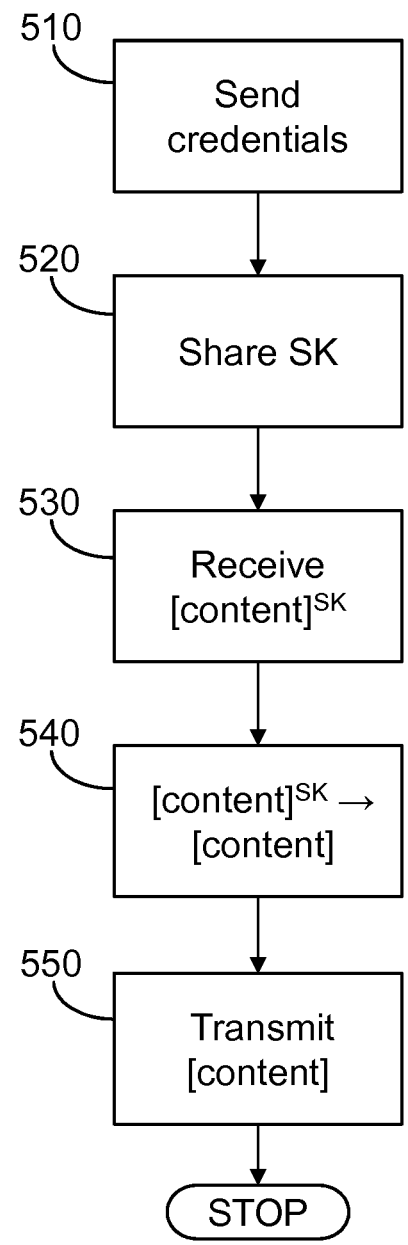
FIG. 5 illustrates operation of the content sink device.

With reference to FIG. 5, the corresponding operation of the sink device 300 commences, once a connection has been established, with a step 510 of sending a digital certificate (or other credentials) to the source device 200. In embodiments in which the sink device 300 also verifies the identity of the source device 200, step 510 includes receiving and verifying a digital certificate or other credentials from the source device 200. This can be advantageous in that it may help to avoid attacks in which a compromised or pirate source device 200 tries to obtain session key information from the sink device 300.

At step 520, the sink device receives session key information, or the session key, and obtains the session key as described above, also sending session key information and performing computations similar to those at step 430 described above in some embodiments, for example using a Diffie-Hellmann scheme, as described above. Once the session key is obtained, (twice) encrypted content can be received at step 530 and decrypted using any cipher of the connection component 370, decrypted by the cipher component at step 540 and transmitted on for use at step 550, for example to the display controller 310 for display by a display screen of the sink device 300, or for causing display on that or another device, and so forth. As described above with reference to FIG. 4, steps 530, 540 and 550 can be executed substantially concurrently, with a content stream passing from component to component as it is processed by respective process steps, for example from a first stream cipher in the connection component 370 to a second stream cipher in the cipher component 360 and on to the display controller 310.

Figure 6:
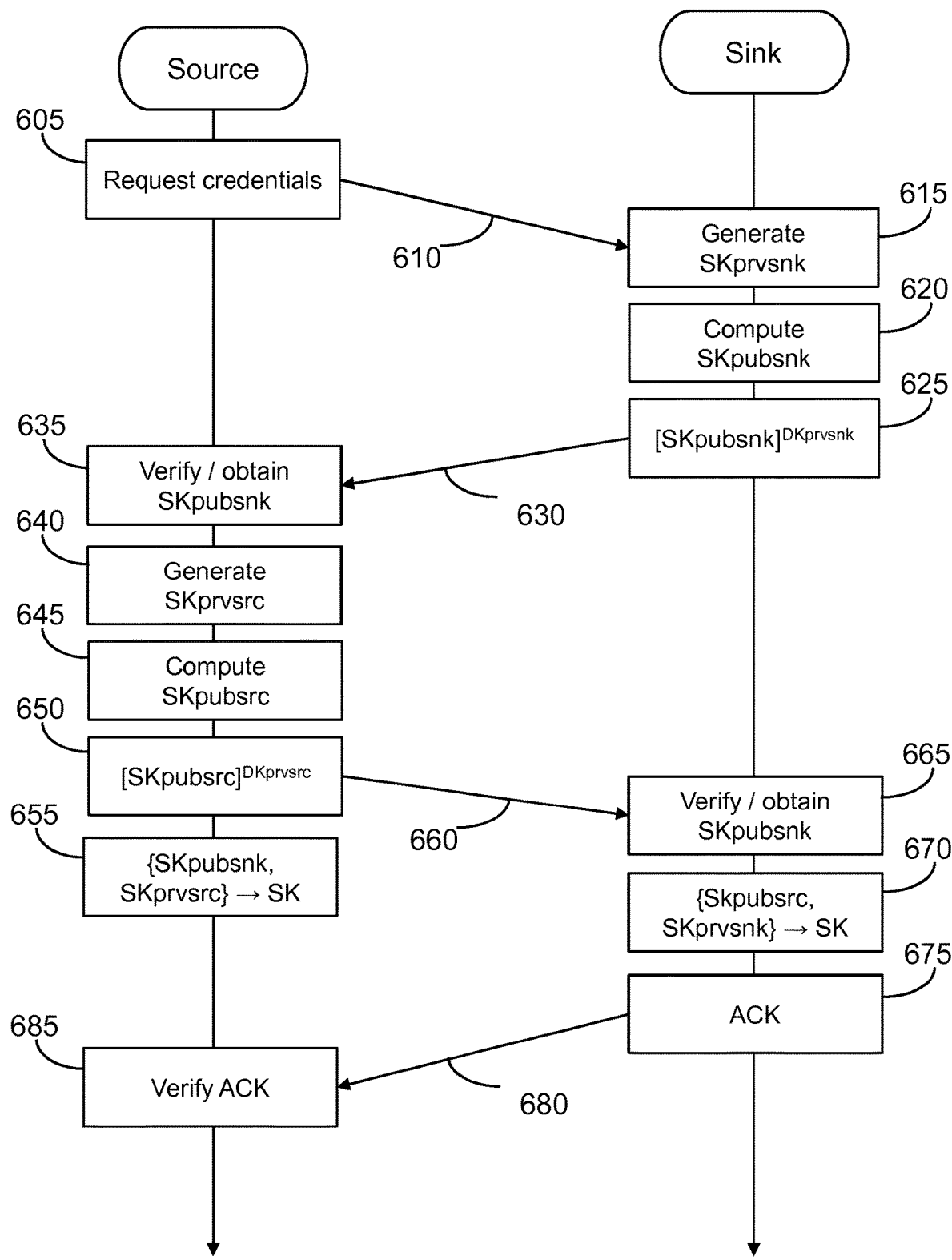
FIG. 6 illustrates a key exchange protocol.

With reference to FIG. 6, an example of a key sharing protocol is now described, in which private keys SKprvsrc and SKprvsnk are generated at, respectively, the source device 200 and sink device 300 and respective public keys SKpubsrc and SKpubsnk are computed therefrom and exchanged, the latter thus being the session key information in this example. Reference will be made to FIG. 6 by reference signs referring to steps illustrated in FIG. 6. All steps may be executed by the respective SE 280, 380 or by the respective cipher component 260, 360, or a combination thereof. For example, all steps involving generation, computation, encryption, decryption or verification of keys may be executed by the SE 280, 380, and the resulting data may be sent via the connection component 270, 370, optionally via the cipher component 260, 360 to limit access to the private SE bus to the cipher component. Mention of actions at the source device 200 and sink device 300 may be construed accordingly.

The source device 200 has an asymmetric key pair comprising a public device key DKpubsrc and a private device key DKprvsrc commissioned to it, together with a digital certificate comprising DKpubsrc and digitally signed by a certificate issuer with its private key CKprv. The sink device 200 has a asymmetric key pair comprising a public device key DKpubsnk and a private device key DKprvsnk commissioned to it, together with a digital certificate comprising DKpubsnk and digitally signed by a certificate issuer with its private key CKprv. The certificate issuer is a trusted entity, for example the issuer of the respective key pair, such as the device manufacturer or a licensing body. A public key CKpub corresponding to CKprv (that is able to decrypt a string encrypted with CKprv) is known to both the source device 200 and the sink device 300. The certificate issuer and key pair may or may not be the same for the two devices. In the latter case it suffices if each device knows the public key of the other device's certificate issuer.

The protocol begins with the source device 200 generating 605 and sending 610 a request for credentials to the sink device 300. In response, the sink device 300 generates 615 a private key SKprvsnk, for example using a pseudo random number generator and/or device entropy, as described above, and computes 620 a public key SKpubsnk from SKprvsnk in line with the specific key sharing scheme, for example using modulo exponentiation, elliptic curve operations or another cyclic or non-cyclic transformation. The sink device 300 encrypts 625 the public key SKpubsnk using its private key DKprvsnk of its asymmetric key pair.

The sink device 300 sends 635 its encrypted public key [SKpubsnk]˜(DKprvsrc) and the digital certificate to the source device 200. The source device 200 verifies 635 the digital certificate and DKpubsnk using CKpub and decrypts [SKpubsnk]˜(DKprvsnk), using DKpubsnk, to obtain SKpubsnk. The source device 200 also generates 640 its own private key SKprvsrc and computes 645 its own public key SKpubsrc, in the same or analogous manner as described above for the sink device 300. Then, the source device 200 uses the private key DKprvsrc of its own asymmetric key pair to encrypt 650 SKpubsrc; the source device 200 also obtains 655 the session key SK, for example as described above, from its own private key SKprvsrc and the received public key SKpubsnk. SK is then used by the source device 200 to encrypt content as described above.

The source device sends 660 the encrypted public key [SKpubsrc]˜(DKprvsrc) and its digital certificate to the sink device 300. The sink device 300 verifies the received digital certificate and obtains 665 the public key SKpubsrc of the source device 200 in the same or analogous manner as for SKpubsnk at step 635 at the source device 200, decrypting [SKpubsrc]˜(DKprvsrc) using DKpubsrc received with the digital certificate. The sink device 300 obtains 670 the session key SK, for example as described above, from its own private key SKprvsnk and the received public key SKpubsrc. SK is then used by the sink device 300 to decrypt content as described above.

In some embodiments, the sink device 300 may generate 675 and send 685 an acknowledgement message to the source device 200. The acknowledgement message may optionally be digitally signed and verified 685 by the source device 200 using the digital certificate of the sink device 300. By means of the acknowledgement message, the source device can establish with increased certainty that the sink device 300 is ready to receive and decrypt content. The process may then continue at steps 440 and 540 described above with reference to FIGS. 4 and 5.

It will be appreciated that other key sharing schemes may be used in other embodiments with a similar process. For example, the public and private keys SKpub and SKprv may be pre-computed, for example from a set of master keys. For example, Blom's scheme may be used to generate the session key information for the source device 200 and sink device 300 and to generate the session key. It will also be appreciated that encrypting the public keys SKpub with a private device key DKprv and distributing the public device key DKpub with a digital certificate issued by a trusted entity is one way to ensure authenticity of SKpub and foil a man-in-the-middle attack. Equally, in some embodiments, this can additionally or instead be achieved by digitally signing SKpub with DKprv and sending SKpub (clear or encrypted) with the signature and certificate comprising DKpub, followed by verification of the signature using the certificate.

Figure 7:
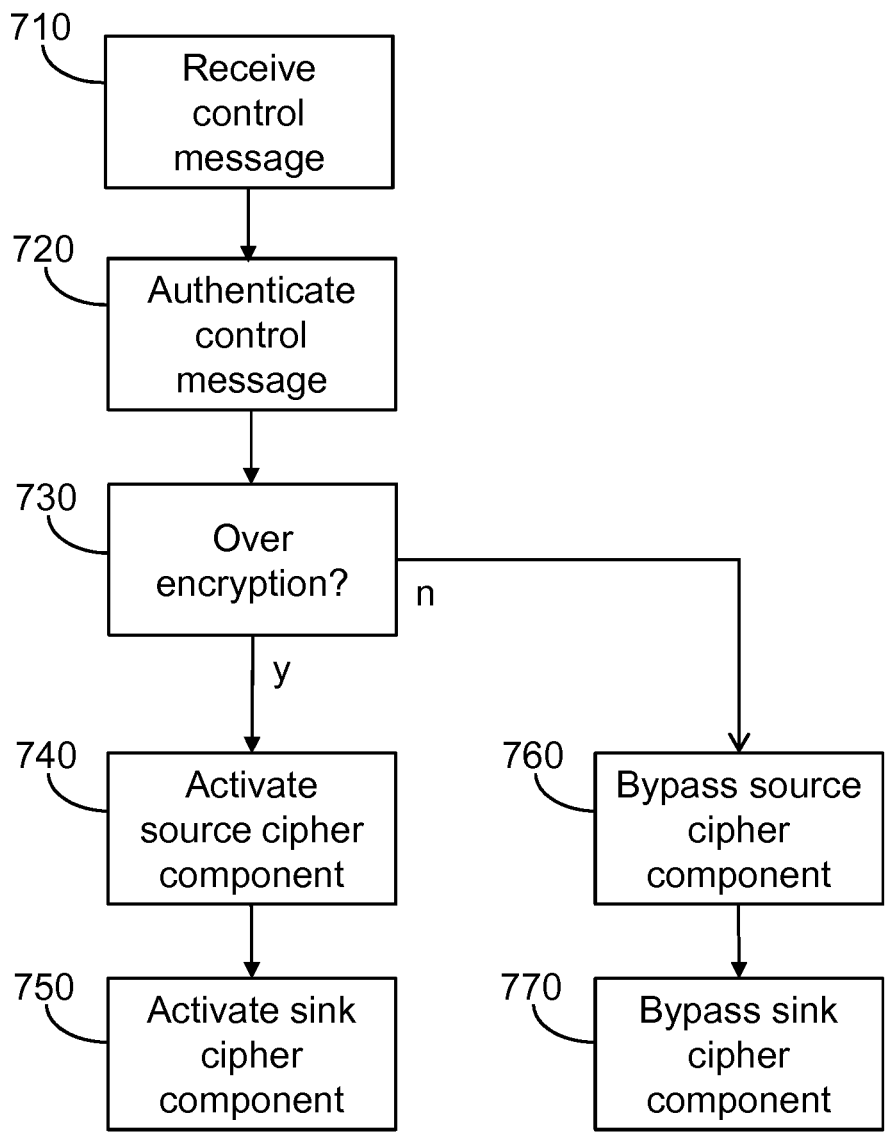
FIG. 7 illustrates a process of applying settings.

With reference to FIG. 7, a process for activating the secondary encryption of the content by the cipher component 260 comprises a step 710 of receiving a control message, for example together with the TS 210 via the CAS 240 at the SE 280 (or, depending on the implementation, by other means, for example via a DRM component from a physical media carrier inserted in the source device 200). At step 720 the source device 200, for example the SE 280 or cipher component 260, authenticates the control message, for example by verifying a digital signature attached to the control message using a digital certificate known to originate from the source of the control message. The control message indicates whether the sink device 300 should be verified (step 410 above) and secondary encryption used (step 440 above).

The control message may also contain other settings for the source and sink devices 200, 300, for example for the cipher components 260, 360, such as until when secondary encryption is to remain active, for example for the duration of the content transmission, until disconnecting the devices 200, 300, until the source device 200 or sink device 300 is rebooted or restarted, until receipt of a control message to the contrary, for the life of the source device 200, and so forth. The control message may also contain other settings. Settings for the source device 200 and sink device 300 may be received in separate, respective messages or in one or more common messages.

If at step 730 the, for example, SE 280 determines that secondary encryption is mandated by the control message, the SE 280 or other component sends a message to the cipher component 260 to activate its encryption at step 740 and the cipher component 260 sends a message, at step 750, to the sink device 300, specifically the cipher component 360, to activate encryption at the cipher component 360. Alternatively, the SE 280 or other component may activate the cipher component 360 directly, or the sink device may receive a separate control message, for example directly from the content provider, in case of a sink device with, for example, internet connectivity or its own CAS.

If the determination at step 730 is negative, the source device 200 and sink device 300 are configured not to apply the secondary encryption, for example setting the source and sink devices 200, 300 to bypass the cipher components 260, 360, or sending a message to the cipher components 260, 360 to enter a pass-through state in which video signals are simply passed through from the frame compose 256 to the connection component 270 and from the connection component 370 to the display controller 310, as the case may be. For example, at step 760 the SE 280 may send a message to the cipher component 260 to set it to a pass-through mode, which in turn sends a message to the cipher component 360 to set it to pass-through mode at step 770. Again, the SE 280 may directly send the message to the cipher component 360.

Figure 8:
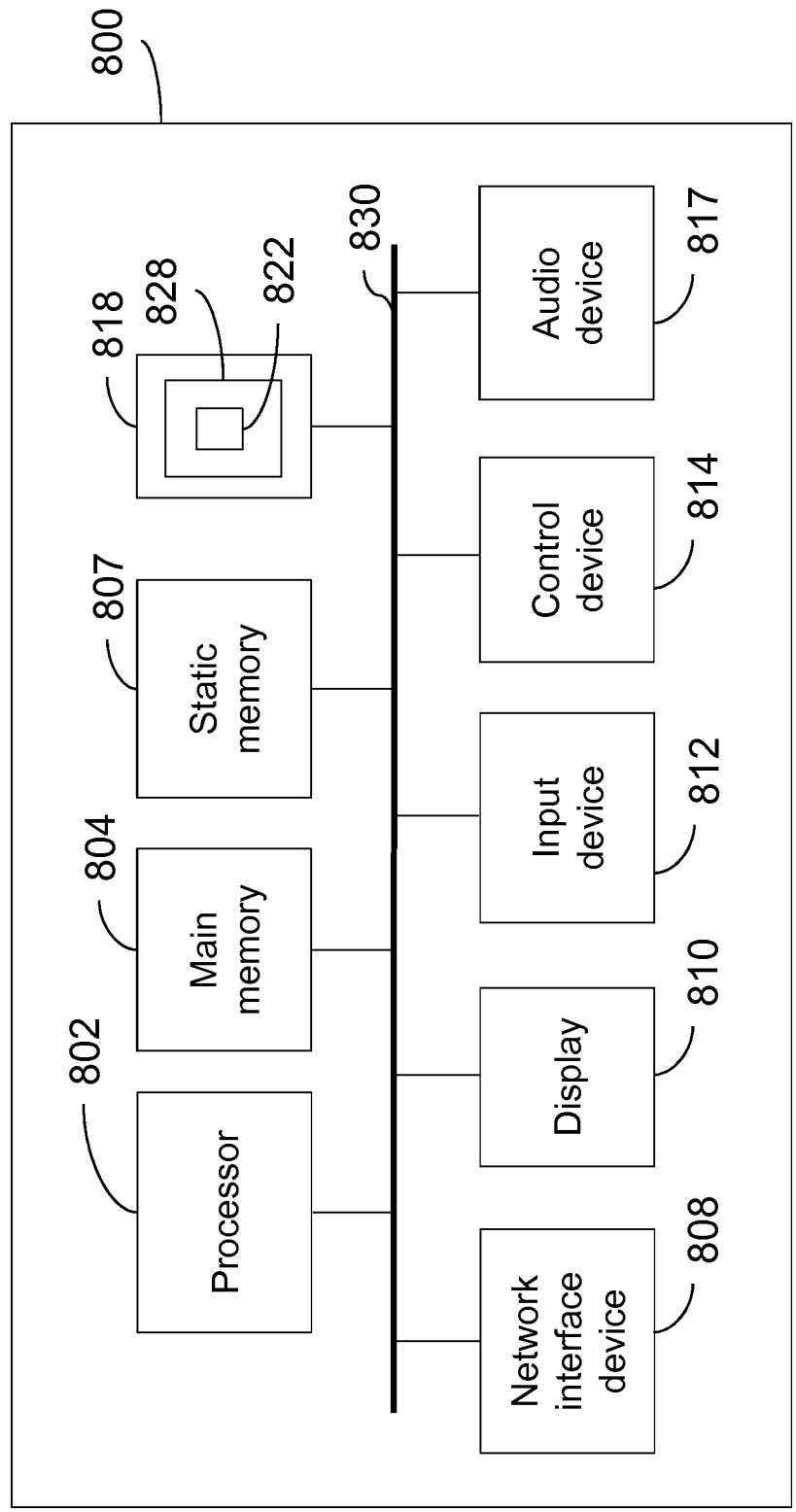
FIG. 8 illustrates a computing device.

FIG. 8 illustrates a block diagram of one implementation of a computing device 800 within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine, for example a computing device embedded in a content display device such as a television set. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 800 includes a processing device 802, a main memory 804 (e.g., read-only memory (ROM), flash memory, dynamic random-access memory (DRAM) such as synchronous DRAM (SDRAM) or Rambus DRAM (RDRAM), etc.), a static memory 806 (e.g., flash memory, static random access memory (SRAM), etc.), and a secondary memory (e.g., a data storage device 818), which communicate with each other via a bus 830. The computing device may also comprise dedicate video and/or audio processing hardware component and other dedicated hardware components, for example a hardware-implemented CAS, SE and/or hardware accelerated cipher components. Typically, the SE will have a separate RAM and/or ROM memory provisioned, which is isolated from the remainder of the device and access to this isolated memory is only via the SE by means of a mailbox or interface buffer mechanism.

Processing device 802 represents one or more general-purpose processors such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute the processing logic (instructions 822) for performing the operations and steps discussed herein.

The computing device 800 may further include a network interface device 808. The computing device 800 also may include a video display unit 810 (for example, a liquid crystal display (LCD) or a cathode ray tube (CRT)), an alphanumeric input device 812 (for example, a keyboard or touchscreen), a cursor control device 814 (e.g., a mouse or touchscreen), and an audio device 816 (for example, a speaker).

The data storage device 818 may include one or more machine-readable storage media (or more specifically one or more non-transitory computer-readable storage media) 828 on which is stored one or more sets of instructions 822 embodying any one or more of the methodologies or functions described herein. The instructions 822 may also reside, completely or at least partially, within the main memory 804 and/or within the processing device 802 during execution thereof by the computer system 800, the main memory 804 and the processing device 802 also constituting computer-readable storage media. The components of the computing device may be arranged and duplicated in various ways to provide components such as the SE 280, 380 and other components described above, which may be provided as separate hardware components, implemented by software on common hardware, or a combination of both.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid-state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the disclosure, it is appreciated that throughout the description, discussions utilizing terms such as "receiving", "determining", "comparing", "enabling", "maintaining", "identifying", "establishing", "encrypting", "decrypting", "transmitting", "preventing", "receiving", "verifying", "determining", "enabling", "generating", "obtaining", "using" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. For example, while processes have been described above, and are depicted in the drawings, in a certain order, it will be appreciated that many of the steps are not inter dependent and that their order can thus be changed to the extent that it is not dictated by any interdependencies. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A content source device configured to connect to a content sink device to transmit digital media content to the content sink device, the content source device comprising:
   connection circuitry configured to
   establish a connection to the sink device;
   encrypt digital media content for transmission across the connection using a first cipher with a connection key; and
   transmit the encrypted digital media content to the sink device over the connection; and
   protection circuitry configured to
   prevent the sink device from using the digital media content without authorization;
   receive a digital certificate identifying the sink device;
   verify the digital certificate;
   determine if the digital certificate identifies a sink device authorized to receive digital media content over the connection; and
   if the determination is positive, enable the sink device to use the digital media content,
   wherein the protection circuitry is further configured to generate a session key, and prevent the sink device from using the digital media content without authorization by encrypting the digital media content with a second cipher using the session key, and transmitting the digital media content encrypted with the first and second ciphers to the sink device; and
   the protection circuitry is further configured to enable the sink device to use the digital media content by sending the session key to the sink device to decrypt the digital media content using the connection and session keys.

2. The content source device according to claim 1, wherein the protection circuitry is further configured to enable the sink device to use the digital media content by the protection circuitry generating first session key information required to obtain the session key and transmitting the first session key information to the sink device.

3. The content source device according to claim 2, wherein the protection circuitry is further configured to generate the session key by receiving second session key information from the sink device and calculating the session key using the first and second session key information.

4. The content source device according to claim 2, wherein the protection circuitry comprises a secure element and a cipher portion, wherein the secure element is configured to receive and verify the digital certificate and send the first session key information to the cipher portion over a private data bus isolated from a remainder of the content source device.

5. The content source device according to claim 1, wherein the protection circuitry comprises a secure element, wherein the secure element is configured to receive and verify the digital certificate.

6. The content source device according to claim 1, wherein determining if the sink device is authorized to receive the digital media content comprises matching the digital certificate with authorization data, wherein the authorization data is received by the content source device from an external data source.

7. The content source device according to claim 6, wherein the content source device comprises a conditional access system and the authorization data is received as part of control or management messages for the conditional access system.

8. The content source device according to claim 1, where the protection circuitry is further configured to receive an activation message and prevent the sink device from using the digital media content without authorization, in response to the received activation message.

9. The content source device according to claim 1, wherein the connection is a wired connection comprising a cable removably connected between the content source device and the content sink device.

10. The content source device according to claim 1, wherein the connection circuitry implements a High-bandwidth Digital Content Protection protocol to encrypt the digital media content.

11. A method for connecting a content source device to a content sink device to transmit digital media content to the content sink device, the method comprising:
    establishing a connection to the sink device;
    encrypting digital media content for transmission across the connection using a first cipher with a connection key;
    transmitting the encrypted digital media content to the sink device over the connection;
    preventing the sink device from using the digital media content without authorization;
    receiving a digital certificate identifying the sink device;
    verifying the digital certificate;
    determining if the digital certificate identifies a sink device authorized to receive digital media content over the connection; and
    if the determination is positive, enable the sink device to use the digital media content,
    wherein the method further comprises
        generating a session key, and preventing the sink device from using the digital media content without authorization by encrypting the digital media content with a second cipher using the session key, and transmitting the digital media content encrypted with the first and second ciphers to the sink device; and
        enabling the sink device to use the digital media content by sending the session key to the sink device to decrypt the digital media content using the connection and session keys.

* * * * *